Feb. 9, 1965 T. HELMBOLD 3,168,979
TRANSVERSE FLOW TYPE BLOWERS
Filed March 20, 1961 3 Sheets-Sheet 1

INVENTOR
Theodor Helmbold

ATTORNEYS

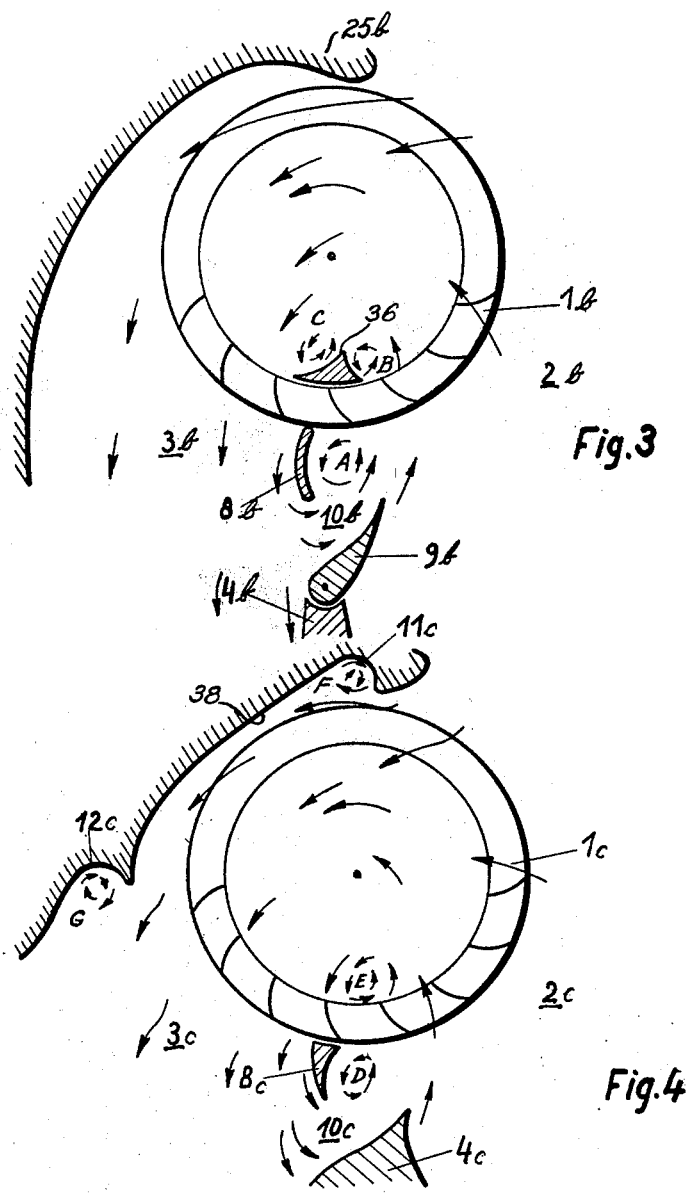

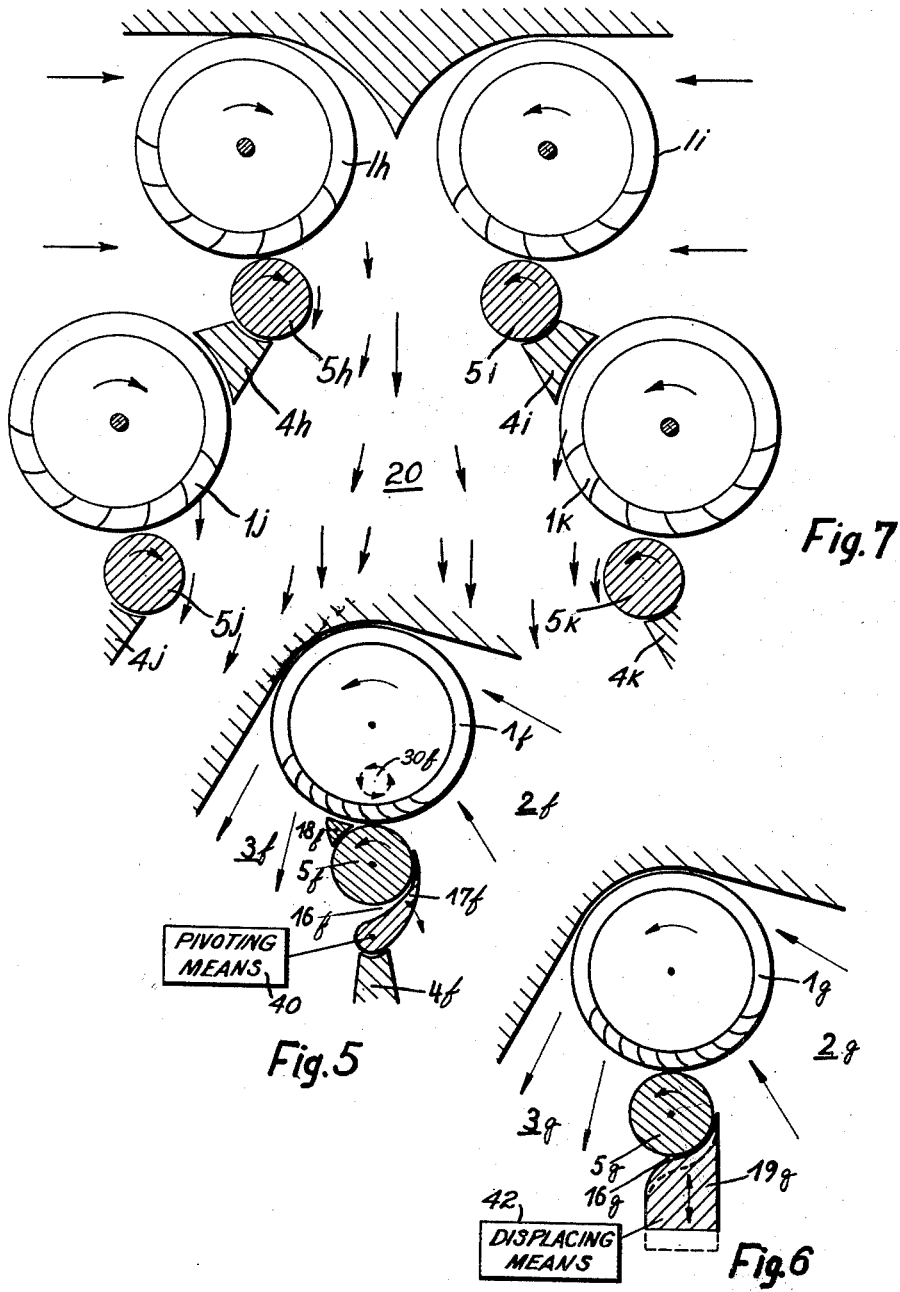

3,168,979
TRANSVERSE FLOW TYPE BLOWERS
Theodor Helmbold, Hedwigstrasse 4, Munich, Germany
Filed Mar. 20, 1961, Ser. No. 96,952
Claims priority, application Germany, Apr. 22, 1960,
H 39,243
7 Claims. (Cl. 230—125)

This invention relates to transverse flow type blowers with drum-shaped rotor and separation between inlet channel and outlet channel.

Transverse flow type blowers with stationary separation between inlet and outlet have been suggested in which the separating part of the housing is formed in many ways for different effects. Stationary separating parts influence, only within certain limits, the stream of the supplied medium passing along said separating parts. A disadvantage of such blowers is that whirls or vortices develop at the periphery of the rotor in its boundary layer with resultant decrease in the efficiency of the blower.

The object of this invention is to avoid these disadvantages and accordingly consists in a transverse flow type blower having an essentially cylindrical body with a rotational axis parallel to the blower rotor and rotating in a free or driven manner, said body being arranged adjacent to the part of the housing forming the separation between inlet and outlet. This cylindrical body is supported freely rotatable in an easy running manner, so that it can be rotated by the medium.

The stream passing along the parts separating the inlet and the outlet, is guided by the rotating surface of the cylindrical body, whereby development of whirls going over the boundary layer are avoided as far as possible.

There is also provided flow influencing means, which adjacent to the separation between inlet and outlet, develop and keep in its position a roller-shaped potential whirl essentially parallel to the rotor axis.

In this case the stream passing through the blower is influenced in substantially the same manner as it is effected by the rotating body.

The means for developing said potential whirl at the desired spot and for maintaining same can be varied. For example, according to one feature of the invention a trough-shaped body is provided, the trough shape of which is essentially adapted to the potential whirl to be guided for guiding the same in a certain part of its circumference.

The rotating body and the potential whirl situated near to the blower rotor, develops an air cushion during operation in the interior of the blower rotor, on one part, and the inner contour of the rotating blade ring on the other part.

In addition, the injurious influence on the stream flowing towards the rotor produced by the medium flowing off between blower rotor and separation is reduced.

According to a further feature of the invention, within the outlet channel of the transverse flow type blower opposite to the cylindrical body there is provided a further cylindrical body, near to the blower rotor, and rotational axis of which body is parallel to the axis of the rotor. Said cylindrical body guiding the flow may be supported in a freely rotatable and easy running manner.

Said rotating guiding body, arranged within the region of lower pressure within the outlet channel of the transverse flow type blower, effects a deflection of the stream passing along said body towards the housing wall, i.e. a certain diffuser effect takes place. At the same time there results a retarding effect on the back flow.

It is also convenient to provide at the side of the blower rotor opposite to the separation between inlet channel and outlet channel, a trough-shaped guiding body for generating and guiding a potential whirl. This potential whirl supports the stream reversing between the blower blades.

In order to get an adaptability to the relative working condition of the transverse flow type blower for changing the cross sectional area of the back flow gap, there is provided an adjustable body. By this is effected, that relative to the working condition, a greater or smaller quantity of the supplied medium is branched off and supplied again to the in-flowing medium in a directed stream at the inlet side.

It is possible according to this invention to arrange several transverse flow type blowers in such a way that their outlet sides exhaust into a common channel. This channel may be enlarged as a diffuser. The rotating bodies partially limiting the channel produce an effect improving the diffuser effect of the common outlet channel so that, especially on arranging two or several pairs of blowers, an extremely short construction of the diffuser is achieved.

The accompanying drawings show several structural embodiments of the invention illustrating and operable upon the foregoing principles, in which like parts have been designated by like reference numerals with differing letter suffixes and in which:

FIGURE 3 shows a further embodiment of transverse flow type blower;

FIGURE 4 shows another embodiment of transverse flow type blower similar to FIGURE 3;

FIGURE 5 is a transverse cross section of a transverse flow type blower equipped with means for regulating the back flow gap;

FIGURE 6 is a transverse cross section of a transverse flow type blower similar to FIGURE 3 equipped with means for regulating the back flow gap; and FIGURE 7 shows an arrangement of several transverse flow type blowers according to the invention, with a common outlet.

Figure 1:
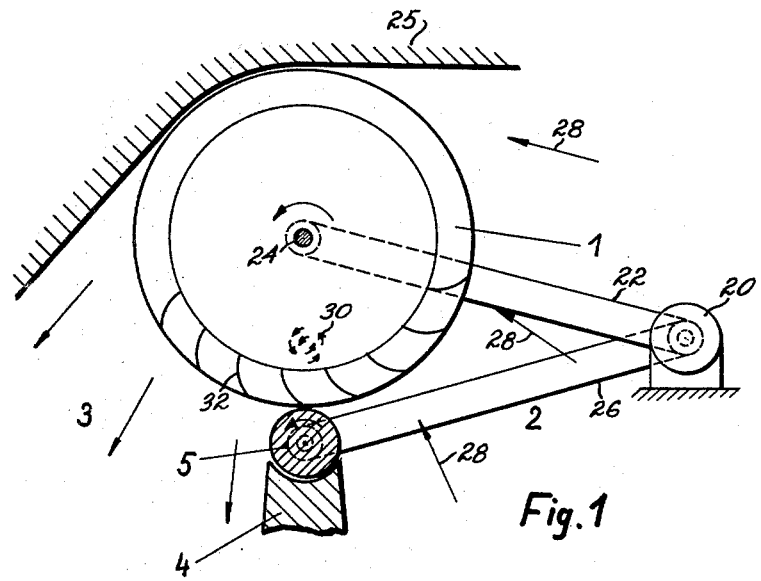
FIGURE 1 shows a transverse cross section of one embodiment of transverse flow type blower of the present invention, with a rotating outer limitation between inlet and outlet.

In FIGURE 1 is shown a blower rotor 1 into which the supplied medium enters from the inlet side or channel 2 and, after flowing through the rotor, is discharged toward the outlet side or channel 3. The separation between inlet 2 and outlet 3 is formed by the housing part 4. Blower rotor 1 is driven by means of a prime mover 20 through a suitable drive connection 22. Prime motor 20, it will be appreciated, may be any suitable motor for the purposes of the present invention to rotate rotor 1 about a fixed shaft axis indicated at 24. The reference character 25 designates a housing wall which delimits channels 2 and 3 in the manner shown. At the side of the separation 4 adjacent to the blower rotor there is arranged a rotatable body 5 in an idler roller manner, rotation of which is produced, in the direction indicated by the arrow, by the flowing medium alone or as augmented by power furnished by prime mover 20 through a suitable power drive connection indicated at 26. The desired relative rotational velocities of body 5 and rotor 1 may be established by any suitable means such as gears or the like (not shown).

In operation of the blower rotor assembly illustrated in FIGURE 1, cylindrical body 5 is rotated in the same direction as rotor 1 is rotated. The axis of rotation of body 5 is parallel to the rotor rotational axis. By rotating rotor 1 the fluid medium is drawn from inlet side 2 and is forced transversely through rotor 1 to the outlet side 3 in the direction shown by the arrows indicated at 28. By rotating body 5 in the same direction as rotor 1, a single vortex indicated at 30 (i.e., a potential whirl) is formed by the fluid medium within the interior of blower rotor 1 at the side thereof which is adjacent to body 5. Vortex 30, as shown, is disposed radially inwardly of the rotor blades indicated at 32.

With the foregoing blower rotor construction, it is readily clear that the axis of whirl of vortex 30 will be generally parallel to the rotor rotation axis and that the direction of whirl will be the same as the direction of rotation of rotor 1. Vortex 30 guides the flow of fluid transversely through rotor 1 as the fluid passes through the interior of rotor 1 in flowing from inlet side 2 to outlet side 3. Since body 5 forms a part of the partition separating inlet side 2 from outlet side 3, the fluid stream in inlet channel 2 will be influenced by rotation of body 5. To this end, it will be appreciated from the structure described that the flow of fluid from inlet side 2 is diverted by body 5 during rotation thereof into the region of vortex 30 to support and thereby maintain vortex 30. At the outlet side 3, the flow influencing effect of rotating body 5 supports the diffusion effect of fluid flowing through outlet side 3. It will be further appreciated that such an influence will provide an increased transformation of velocity head into static pressure head with only a given relatively small length of fluid flow channel as formed by outlet side 3.

The principle by which vortex 30 is developed is believed to be elemental and is fundamentally treated in known texts such as Van Nostrand's Scientific Encyclopedia, third edition, page 217 et. seq. Thus, it will suffice to state that the fluid medium region of separation between a body 5 while rotating in its predetermined direction and the stream of fluid passing through rotor 1 will become unstable under the control of body 5 and break down with the resultant formation of vortex 30.

Thus, rotation of body 5 in its predetermined direction provides a definite, deliberate and controlled vortex pattern which guides the fluid stream as it passes through rotor 1. Consequently, the injurious influence on the fluid stream flowing towards rotor 1 as a result of medium flowing off between the rotor inlet and rotor outlet is reduced by the presence of vortex 30.

The development of vortices or whirls at the boundary layer formed next to body 5 is partially precluded since body 5 is partially surrounded in close proximity by housing partition part 4. As a result, no stream can flow at the covered portion of body 5 and hence no further increase of the boundary layer can take place so that with each revolution of body 5 a new boundary layer will develop. Since the development of undesired and uncontrolled whirls or vortices generally requires more than a single revolution of body 5, the surface of body 5 will therefore be substantially free of such undesired whirls.

Figure 2:
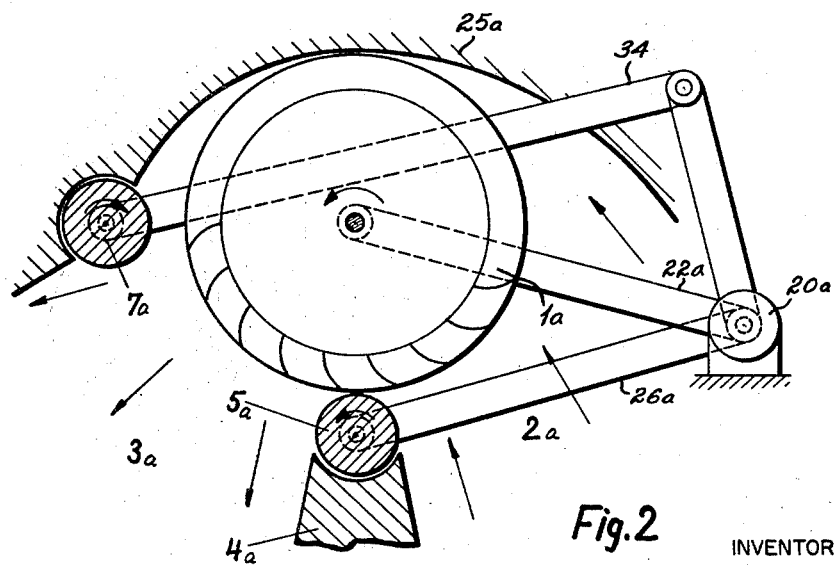
FIGURE 2 shows another embodiment of transverse flow type blower with an additionally arranged rotating flow guiding body.

Shown in FIGURE 2 is a transverse flow type blower 1a in which parts corresponding to components of the embodiment illustrated in FIGURE 1 are designated by like reference characters suffixed by the letter "a." The blower assembly of FIGURE 2 is the same as that of FIGURE 1 except that there is provided in the outlet channel 3a of blower 1a, opposite to the cylindrical body 5a, a further rotatable cylindrical flow guiding body 7a. The direction of rotation of this cylindrical flow guiding body 7a is opposite to that of the blower rotor 1. The axis of rotation of body 7a is parallel to the rotational axes of rotor 1a and body 5a. Body 7a may be mounted to be freely rotatable about its axis by flow of fluid through outlet side 3a, or it may be driven by power furnished through a suitable drive 34 from prime mover 20a. This additional drive considerably increases the guiding effect of body 7a on the fluid stream which is also the case with body 5 of FIGURE 1 and body 5a of FIGURE 2.

Body 7a is disposed in the region of lower pressure of the fluid stream flowing through channel 3a. Rotation of body 7a in the direction shown deflects the exiting fluid stream towards the interior surface of casing 25a. This deflection produces a diffuser effect and also results in a retarding effect on back flow or which is commonly known as "reverse flow" which can take place along the wall of casing 25a. The manner in which this back flow has a tendency to occur is basically treated in Van Nostrand's Scientific Encyclopedia (pp. 217 et seq.) mentioned previously and hence, the theory involved is not discussed further herein.

It is apparent that the operation of the assembly shown in FIGURE 2 is the same as that for FIGURE 1 except for the addition of body 7a. Rotation of body 7a further improves the diffusion effect in channel 3a by supporting or guiding the fluid stream on the side of channel 3a opposite from body 5a.

FIGURE 3 shows a transverse flow type blower 1b wherein parts corresponding to components of the assembly illustrated in FIGURE 1 are designated by like reference characters suffixed by the letter "b." With the blower 1b illustrated in FIGURE 3, a trough-shaped guiding body 8b is arranged outside of blower 1b at the separation between inlet 2b and outlet 3b. Between the trough-shaped body 8b and the partition wall 4b there is provided a back flow gap 10b adjustable in size by aid of a pivotally movable part 9b forming an extension of partition wall 4b. With blower 1b, the fluid stream is drawn from inlet 2b into the interior of blower 1b and is forced therethrough towards outlet channel 3b. Outlet channel 3b is delimited on one side by housing wall 25b.

The back flow gap or space 10b allows a small portion of the stream of fluid forced through rotor 1b to flow back to inlet 2b. As a result a vortex or potential whirl indicated at A is formed in the inlet channel 2b adjacent to body 8b in the manner shown in FIGURE 3. Vortex A diverts the entrance fluid passing within the region thereof toward blower rotor 1b.

With continued reference to FIGURE 3, an element 36 is shown to be fixedly mounted within the interior of blower rotor 1b and preferably extends over the full length of the rotor. With element 36 two vortices or whirls C and B will be formed instead of one as shown in FIGURES 1 and 4, for example. Vortices B and C, it will be appreciated, are guided by element 36 such that vortices B and C do not move away from the positions shown and cause noise and less efficient operation. Element 36 is generally trough-shaped for generating and guiding vortices C and B and is positioned at the side of rotor 1b opposite to the separation partition between inlet 2b and outlet 3b. The whirl of fluid generated by element 36 supports the stream reversing between the blower rotor blades.

With continued reference to FIGURE 3, body 8b is positioned between the vortex formed thereby and outlet channel 3b, and gap 10b is positioned between body 8b and partition 4b. The size and energy of vortex A is controlled by swingably adjusting the position of part 9b to meet different working conditions. Thus it will be appreciated that by adjusting the position of part 9b, the cross sectional flow area of gap 10b is correspondingly changed. As a result, the quantity of fluid that is branched off and supplied again to the in-flowing medium at inlet 2b is thereby controlled and selectively varied. A particular advantage residing in the provision of the adjustable back flow gap 10b is that the quantity of flow through gap 10b can be minimized at start-up or during periods of small throughputs to keep the quantity of the supplied medium flowing through rotor 1b always in such limits that the blower rotor will operate with high efficiency. As a result the adjustable back stream gap 10b facilitates starting the blower and working up to the normal working speed.

In FIGURE 4 is shown a transverse flow type blower similar to that shown in FIGURE 3, which is provided outside of the blower rotor 1c opposite the separation 4c, with a trough-shaped guiding body 11c. Within the outlet 3c at the opposite side to the separating body 4c there is also arranged a trough-shaped guiding body 12c. The longitudinal axes of the two trough-shaped guiding bodies 11c and 12c are both preferably parallel to the rotor axis.

The operation of the blower unit shown in FIGURE 4 is essentially the same as that of the blower unit illustrated in FIGURE 3. Gap 10c, however, is not adjustable and element 36 as shown in FIGURE 3 has been eliminated. As a result, it is clear that two vortices indicated at D and E will be formed. Vortex D is formed by body 8c in the same manner as vortex A and has the same influence on the incoming fluid stream as vortex A.

The position of vortex E, it will be appreciated, is maintained by vortex D.

During operation of blower rotor 1c, vortices indicated at F and G will be formed within the recessed spaces delimited by troughs 11c and 12c respectively. Troughs 11c and 12c are formed by the housing wall 38 for blower rotor 1c. When rotor 1c is operated to force a stream of fluid medium into outlet 3c, the vortices F and G will be formed in the manner shown. This fluid stream is diverted toward wall 38 by vortex F due to its pattern and direction of whirl imparted by the shape of trough 11c. As a result, the fluid flow distribution across outlet 3c is improved. Vortex G which is guided by trough 12c causes a diffusion effect in outlet 3c and draws the flowing fluid in a direction towards wall 38. As a result, a substantial enlargement of effective cross-sectional fluid flow area in outlet 3c is obtained without interrupting the flow.

The transverse flow type blower shown in FIGURE 5 is arranged, between inlet channel 2f and outlet channel 3f near the blower rotor 1f, with a rotatable body 5f. A back flow gap 16f is formed between the rotating body 5f and the pivotably arranged part 17f. To this end, pivoting means 40 has been schematically shown in the drawing. For effecting a better flow guide, a guiding body 18f is provided between the rotating 5f and the blower rotor 1f.

In operation of blower rotor 1f shown in FIGURE 5, fluid flow directed to rotor 1f is guided by body 5f toward the vortex 30f formed within rotor 1f. This formation of vortex 30f and the diffusion effect produced by body 5f is described in the embodiment of FIGURE 1. Adjustment of part 17f varies the width of gap 16f for the same purpose described in connection with passage 14d of FIGURE 5.

FIGURE 6 shows a transverse flow type blower, also equipped with a rotating body 5g between inlet channel 2g and outlet channel 3g immediately adjacent the blower rotor 1g. In this case, the adjustment of the back flow channel 16g is effected by longitudinal rectilinear displacement of the body 19g. For this purpose, displacing means 42 has been schematically shown in the drawing.

Operation of the assembly illustrated in FIGURE 6 is essentially the same as that described for the embodiment of FIGURE 5.

The arrangement shown in FIGURE 7 consists of several transverse flow type blowers 1h, 1i, 1j and 1k, the outlet sides of which exhaust into a common channel 20h formed as a diffuser.

To this end, it is clear that each blower 1h, 1i, 1j and 1k are constructed substantially the same as the blower unit of FIGURE 1 with like parts having been designated by like reference numerals with differing letter suffixes. Accordingly no further detailed description of blowers 1h, 1i, 1j and 1k is believed to be necessary except that it is apparent that bodies 5h, 5i, 5j and 5k influence the flow of fluid to the common outlet channel 20 diffusively, i.e., the fluid stream is drawn outwardly in the region of bodies 5h, 5i, 5j and 5k when rotated. As a result, the cross-sectional area in this range can be substantially enlarged without the formation of turbulences or interruptions in the flow passing through and thus disrupting the diffusion effect. The arrangement of the blower of the application shown in FIGURE 7 thus permits the common exit channel 20 to be developed as a diffuser with an especially large increase in cross-sectional area and therefore a relatively shorter length.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A transverse flow type blower, comprising a casing, a drum shaped rotor disposed within said casing, and partition means positioned with respect to said rotor and casing so as to form opposing inlet and outlet channels, said rotor being rotatable in a predetermined direction to convey a fluid medium from said inlet channel to said outlet channel, the fluid flowing through said rotor normally forming a vortex between the center of said rotor and said partition means adjacent the periphery of said rotor, said partition means comprising a wall portion and a cylindrical body rotatably mounted between said wall portion and said rotor about an axis extending substantially parallel to the rotational axis of said rotor, said wall portion having a positionable member comprising means to provide a back flow fluid passage for permitting discharge fluid in said outlet channel to return to said inlet channel, and drive means for rotating said cylindrical body in the same direction as said predetermined direction, said cylindrical body being effective when rotated in said same direction to so deflect return fluid flowing through said back flow fluid passage as to oppose movement of the vortex in said rotor.

2. A transverse flow type blower according to claim 1, including means for pivoting said positionable member.

3. A transverse flow type blower according to claim 1, including means for linearly displacing said positionable member.

4. A transverse flow type blower, comprising a casing, a drum shaped rotor disposed within said casing, and partition means positioned with respect to said rotor and casing so as to form opposing inlet and outlet channels, said rotor being rotatable in a predetermined direction to convey a fluid medium from said inlet channel to said outlet channel, the fluid flowing through said rotor normally forming a vortex between the center of said rotor and said partition means adjacent the periphery of said rotor, said partition means comprising a wall portion and a cylindrical body rotatably mounted between said wall portion and said rotor about an axis extending substantially parallel to the rotational axis of said rotor, and drive means for rotating said cylindrical body in the same direction as said predetermined direction, said cylindrical body being effective when rotated in said same direction to so deflect return fluid flowing through said back flow fluid passage as to oppose movement of the vortex in said rotor.

5. A transverse flow type blower according to claim 4, further including a rotatable cylindrical body mounted within said outlet channel opposite the cylindrical body of said partition means, with the rotational axis of said further body being parallel to the axis of the rotor.

6. The blower defined in claim 5 comprising drive means for rotating said further cylindrical body in a direction opposite to that of said rotor.

7. An assembly comprising a plurality of transverse flow type blowers having a common fluid outlet channel, each of said flow type blowers comprising a fluid inlet channel, a drum shaped rotor disposed between said inlet channel and said outlet channel and being rotatable in a predetermined direction to convey a fluid medium from said inlet channel to said outlet channel, partition means separating and delimiting said inlet and outlet channels and being disposed adjacent and exteriorly of said rotor, said partition means comprising an essentially cylindrical body mounted for rotation in the same direction as said predetermined direction about an axis extending substantially parallel to the rotational axis of said rotor.

References Cited by the Examiner

UNITED STATES PATENTS 2,942,773 6/60 Eck _____ 230—125

FOREIGN PATENTS 559,024 1/58 Belgium.

JOSEPH H. BRANSON, Jr., Primary Examiner.